Nov. 6, 1945.   H. P. KUEHNI ET AL   2,388,555
AUTOMATIC PATTERN CONTROLLED MACHINE TOOL
Filed May 7, 1943    5 Sheets-Sheet 3

Inventors:
Hans P. Kuehni,
Norman G. Branson,
by Harry E. Dunham
Their Attorney.

Inventors:
Hans P. Kuehni,
Norman G. Branson,
by *Harry E. Dunham*
Their Attorney.

Patented Nov. 6, 1945

2,388,555

UNITED STATES PATENT OFFICE 2,388,555

AUTOMATIC PATTERN CONTROLLED MACHINE TOOL

Hans P. Kuehni and Norman G. Branson, Schenectady, N. Y., assignors to General Electric Company, a corporation of New York Application May 7, 1943, Serial No. 486,046

16 Claims. (Cl. 90—13.5)

This invention relates to automatic pattern controlled machine tools, more particularly to control systems for such machine tools, and a more specific object of the invention is the provision of a simple, reliable, and improved control system of this character.

The present application is a continuation in part of earlier filed application Serial No. 472,840, filed January 18, 1943, and assigned to the same assignee.

More specifically, the invention relates to automatic pattern controlled machine tools such as milling machines, lathes, and the like, and a further object of this invention is the provision of means for effecting a relative movement of the cutter and work piece at a constant contour speed for all angles of such relative movement so that the tool marks on the work will be evenly spaced irrespective of the shape which is being cut.

The relative movement of the cutter and the work piece in machine tools of this character is controlled by means of a tracer device which is maintained in engagement with the pattern as it is moved along the profile thereof.

Another object of the invention is the provision of a control system for a pattern controlled machine tool in which the two components of the relative movement of the cutter and the work piece are continuously correlated so that the movement is not a series of steps and a fine, stepless finish of the work is obtained.

In carying the invention into effect in one form thereof, means are provided for supporting the pattern and the work piece in operative relationship with the tracer and cutter, respectively. Suitable driving means controlled by the tracer are provided for effecting the relative movement of the cutter and the work piece. This relative movement of the cutter and the work piece is the resultant of two angularly displaced components, e. g., a longitudinal movement and a transverse movement. Means controlled by the tracer control the driving means so that the vector sum of the speeds of these two component movements is approximately constant irrespective of the magnitude of either, and therefore, irrespective of the angle of the resultant movement. This is accomplished by controlling the driving means in response to continuous variation of the force between the pattern and the tracer so that the speed of one of these components is continuously varied from a maximum value in one direction to a maximum value in the reverse direction, dependent upon the magnitude of the force, and the second component is unidirectional and its speed is simultaneously varied in inverse relationship to the speed of the first component.

In a specific embodiment of the invention, the tracer device includes a magnetostrictive member, i. e., a member whose magnetic permeability changes in response to the application of a force to the member. This change in permeability of the magnetostrictive member is utilized to produce a control voltage which in turn is utilized to control the driving means in the manner described in the foregoing.

In illustrating the invention in one form thereof, it is illustrated as embodied in a control system for an automatic pattern controlled metal cutting lathe, and also in a control system for a polar co-ordinate type milling machine.

For a better and more complete understanding of the invention, reference may now be had to the following specification and to the accompanying drawings in which Fig. 6 is a diagrammatical sketch which illustrates graphically the variation of the force between the pattern and the tracer finger at various angles.

Figures 1, 2:
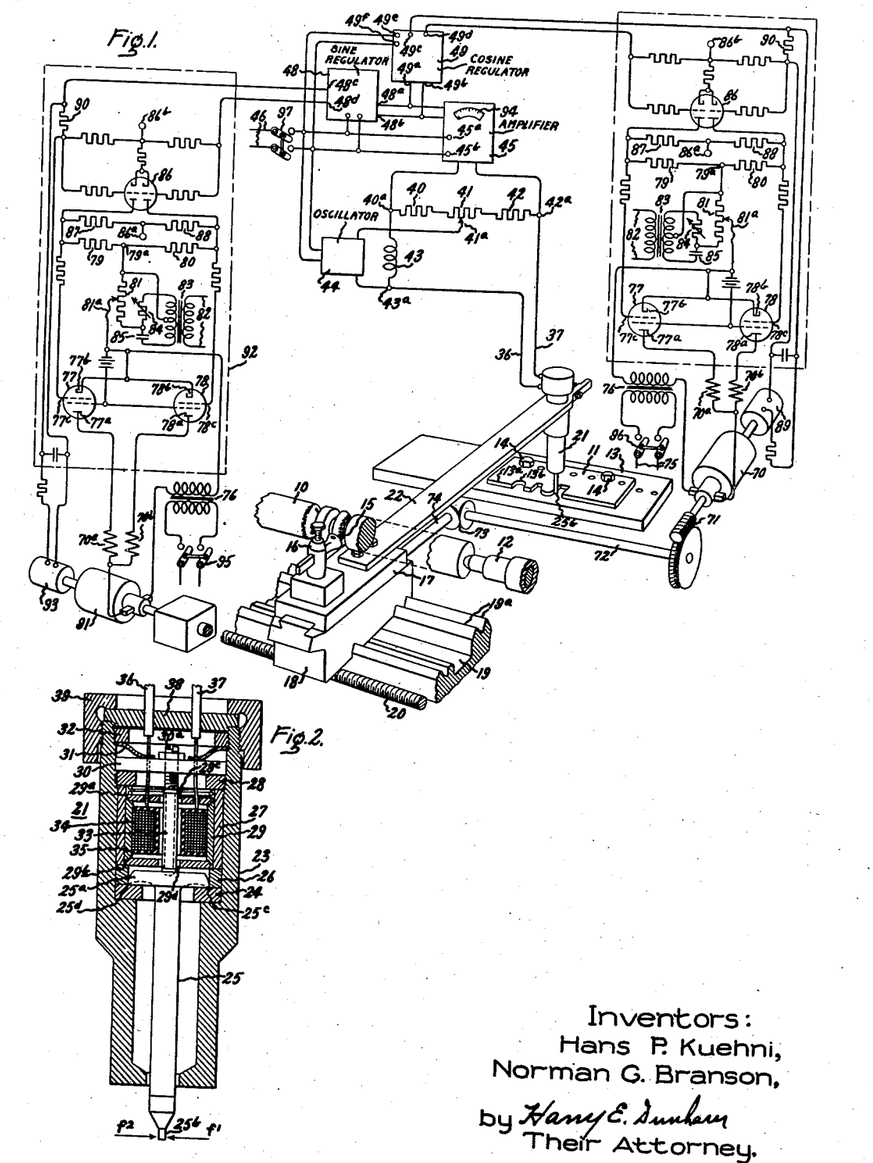
Fig. 1 is a simple, diagrammatical illustration of an embodiment of the invention as applied to a lathe.
Fig. 2 is a detailed sectional view of the tracer element.

Referring now to the drawings, it is desired to turn a metallic work piece 10 so that the final profile will conform accurately to the profile of the pattern 11. The work piece 10, which may be of steel or other material, is rotated by suitable driving means about a longitudinal axis defined by the lathe centers of which only the tail stock center 12 is illustrated. The driving means for rotating the work may be and preferably is a direct current electric motor supplied from a source of alternating voltage through suitable electric valve apparatus which may be controlled to adjust the speed of rotation of the work piece to a desired value. Since the details of this motor and the electric valve control apparatus from which it is supplied constitute no part of the invention, they are omitted from the drawings in the interest of simplicity.

The pattern 11 is supported by suitable means illustrated as a plate 13 to which the pattern 11 is firmly clamped by suitable means such as clamping screws 14. The supporting plate 13 may be securely fastened to the bed of the lathe, or may be built as an integral part of the lathe.

A cutter 15 is held in a tool post 16 which is mounted in a compound rest comprising an upper cross feed member 17 which is slidably mounted on the cross feed slide of the carriage 18. The carriage 18 is slidably mounted on ways 19a for longitudinal movement along the bedplate 19. The longitudinal movement is effected by means of a lead screw 20 and a cooperating threaded member (not shown) with which the carriage is provided.

A tracer 21 is maintained in fixed but adjustable relationship with respect to the cutter by means of a rigid supporting arm 22 to which the tracer 21 is firmly secured and which, in turn, is rigidly secured to the cutter supporting means, i. e., the compound rest 17. Thus the tracer 21 and the cutter 16 are supported in operative relationship, respectively, with the pattern 13 and work piece 10.

A preferred construction of the tracer device 21 is illustrated in Fig. 2. It comprises an outer cylindrical shell 23 which is formed of mild steel. The upper portion of the shell 23 is bored to have a larger inside diameter than the inside diameter of the lower portion, thereby to provide a seat for a ring 24 which is preferably made of hard tool steel. A tracer finger 25 which is made of hard tool steel and has a shape which is generally similar to that of a poppet valve is mounted within the bore of the lower portion of the shell with its flanged head bearing on the hardened seating ring 24. The lower end of the finger 25 projects through an opening in the bottom of the cylindrical shell and is of tapering shape to provide a cylindrical portion 25b which serves as the contact point which engages the profile edge of the pattern. The clearance between the finger and the outer shell at the bottom may be made quite small, e. g., .01 inch. A second hard steel ring 26 rests upon the lower hard steel ring 24. As indicated, the inside diameter of the ring 26 is greater than the inside diameter of the lower ring 24 so as to provide sufficient space for the flanged head of the tracer finger 25.

A cylindrical spacing member 27 made of hard tool steel is fitted within the large diameter bore in the upper portion of the shell. This cylindrical member is held firmly against the upper hardened ring 26 by means of an annular member 28 which is in threaded engagement with the internal wall of the shell 23.

Within the cylindrical spacing member 27 is a cylindrical jacket 29 which may be made of any suitable magnetic material, e. g., one of the well-known nickel-iron alloys such as Nicalloy or Permalloy. This jacket has a top cap 29a and a bottom cap 29b. These caps are provided with centrally disposed openings 29c and 29d, respectively.

Above the screw ring 28 is a disk member 30 made of hard tool steel. It is firmly seated on the ring 28 by means of a spring washer 31 the tension of which may be suitably adjusted by means of a threaded annular member 32, which is in internal threaded engagement with the wall of the shell 23. The disk 30 is provided with an adjustable set screw 30a.

A hollow cylindrical member 33 made of a material possessing the property of magnetostriction, such as nickel-steel, is arranged centrally within the cylindrical jacket 29 and is of sufficient length to project through the openings 29c and 29d in the top and bottom caps 29a and 29b, respectively. This magnetostrictive element is firmly held between the set screw 30a and the top surface of the horizontal flange of the tracer finger. As shown, the top surface of the flange is provided with a rounded recess to receive the rounded end of the cylindrical magnetostrictive element.

If a force is applied to the contact point 25b of the tracer finger in any radial direction in a plane perpendicular to the longitudinal axis of the finger, a limited rotation of the finger 25 about a point on the seating ring 24 as a pivot will result. For example, if a force $f_1$ acting toward the left is applied to the contact point 25b, the finger will be given a limited rotation in a clockwise direction about the point 25c as a center, and the flanged head 25a acting as a lever will apply a force to compress the magnetostrictive member. Likewise, if a force $f_2$ acting toward the right is applied to the contact point 25b, the finger 25 is given a limited counterclockwise rotation about the point 25d as a center, and the flanged head 25a will apply a force to compress the magnetostrictive member 33. Thus, the tracer finger 25 acts as a bell crank to apply a compressional force to the magnetostrictive member 33 in response to the application of force to the contact point 25b in any radial direction in a horizontal plane. The compression of the magnetostrictive element is therefore independent of the direction of the force applied to the tip of the tracer finger. In other words, the tracer is nondirectional. The application of a force to the magnetostrictive element effects a change in its magnetic permeability.

Within the jacket 29 and surrounding the magnetostrictive member 33 is a coil 34 which is wound upon a spool 35 that is preferably made of a suitable phenolic condensation product, such as Bakelite. The magnetostrictive member and the jacket 29 form a magnetic circuit for the magnetic flux produced by the coil. Leads 36 and 37 are brought out from the coil through openings in the top cap 29a, the disk 30, and the disk shaped terminal bracket 38 which is clamped in place at the upper end of the shell by means of an internally threaded clamping ring 39 which is in threaded engagement with the outside wall of the shell 23 at the upper end thereof. The coil 34 constitutes one arm of a Wheatstone bridge, the remaining arms of which comprise the resistor 40 plus the portion of resistor 41 at the left of the slider 41a, the resistor 42 plus the portion of resistor 41 at the right of the slider, and the coil 43.

A periodically varying voltage of suitable frequency, e. g., 2,000 cycles per second is supplied to the opposite bridge points 41a and 43a from an electric valve type oscillator 44. Any suitable type of oscillator may be used. The constructional details of the oscillator are unimportant and the oscillator is therefore indicated conventionally in the drawings.

The Wheatstone bridge is initially balanced by adjustment of slider 41a when no force is applied to the tracer finger and the magnetostrictive element is prestressed. When a force is applied to the tracer finger, this force is multiplied and translated into a compressional force acting on the magnetostrictive member. The resulting change in permeability of the magnetostrictive member unbalances the Wheatstone bridge and causes a periodically varying voltage to appear across the opposite bridge points 40a and 42a. This unbalanced voltage is applied to the input terminals of an electric valve type amplifier 45. Preferably the amplifier 45 is of the type which has a direct voltage output that is approximately linearly proportional to the effective value of the periodically varying input voltage. Since amplifiers of this type are available on the market, it is unnecessary to illustrate the constructional and circuit details of the amplifier 45 and therefore it is represented conventionally in the drawings. Direct current power is supplied to the power input terminals 45a and 45b of the amplifier from a suitable source such as a regulated power supply (not shown) which is conventionally indicated in the drawings by the two supply lines 46.

Figure 5:
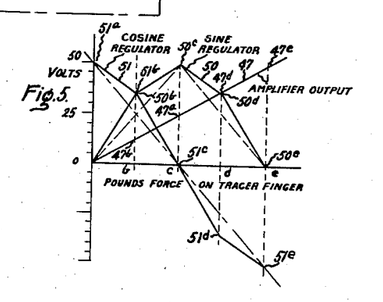
Fig. 5 is a chart of characteristic curves which serve to explain the operation of the invention.

The relationship between the force applied to the tracer finger and the output voltage of the amplifier 45 is illustrated graphically by the straight line curve 47 in Fig. 5, in which ordinates represent the volts and abscissae represent force acting on the tracer finger. This curve 47 indicates that the direct voltage output is approximately linearly proportional to the force acting on the tracer finger.

The output voltage of amplifier 45 is applied simultaneously to the input terminals 48a, 48b, and 49a, 49b of two electric valve type regulators 48 and 49, respectively, which are referred to as the sine regulator and the cosine regulator, respectively. The sine regulator is an electric valve apparatus which has a direct voltage output which approximates a sine function of the direct voltage applied to its input terminals. That is to say, that as the voltage applied to the input terminals 48a and 48b varies continuously and linearly from a minimum value to a higher value, the voltage at the output terminals 48c and 48d of the sine regulator varies continuously from a minimum value to a maximum value and then to a minimum value, as indicated by the curve 50 of Fig. 5. The cosine regulator 49 is a similar electric valve apparatus, the direct output voltage at the output terminals 49c and 49d of which varies approximately as a cosine function of the direct voltage applied to its input terminals. Since the input voltages of the sine regulator and cosine regulator are the output voltage of the amplifier 45 which is linearly proportional to the force applied to the tracer finger, the output voltage of the sine and cosine regulators are therefore sine and cosine functions of this force.

Figure 3:
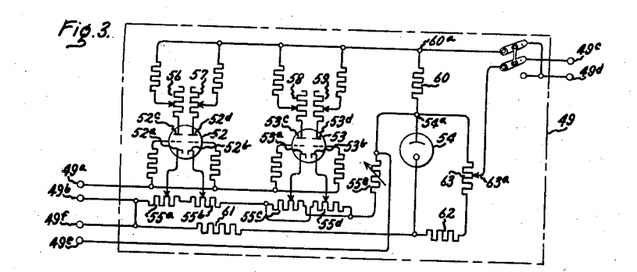
Figs. 3 and 4 are simple, diagrammatical illustrations of the sine and cosine regulators which constitute parts of the control system.

As indicated in Fig. 3, the cosine regulator comprises a plurality of electric valves 52, 53, and 54. Although the electric valves 52 and 53 may be of any suitable type, they are preferably twin triode valves of the "hard" tube type. The valve 54 is a cold cathode type diode valve containing a small amount of an inert gas such as neon. The important characteristic of this type of valve is that when connected in series with a resistor across a source of variable voltage, the voltage drop across the terminals of the valve remains substantially constant.

Direct current power at a suitable voltage is supplied to the power input terminals 49e and 49f of the cosine regulator from a suitable source such as the regulated power supply represented by the two supply lines 46. A voltage divider comprising fixed resistor portions 55a, 55b, 55c and 55d in parallel with each other and a variable resistor portion 55e is connected across the power input terminals 49e and 49f. The cathodes 52a and 52b of valve 52 and the cathodes 53a and 53b of valve 53 are connected by means of sliders to points on this voltage divider of progressively increasingly positive voltage so that the left-hand conducting path of valve 52 is biased to cutoff, and the right-hand path of valve 52 and both paths of valve 53 are biased beyond cutoff by progressively increasing amounts. The grids of both valves are all connected together to the input terminal 49a, and the negative terminal of the cathode voltage divider is connected to the input terminal 49b.

The anodes 52c and 52d of valve 52 and the anodes 53c and 53d of valve 53 connect through parallel adjustable resistors 56, 57, 58, and 59, respectively, and through a series resistor 60 to the anode of valve 54 which is directly connected to the positive power input terminal 49e.

The valve 54 is connected in series with a resistor 61 across the power supply, and a voltage divider comprising fixed resistor 62 and adjustable resistor 63 is connected across the valve 54. The power input voltage may be any suitable value which may be assumed, for example, to be 300 volts. Accordingly, the voltage of the terminal 54a is 300 volts positive. The slider 63a is initially adjusted to a point on the voltage divider such that the voltage drop between terminal 54a and the slider is equal to the voltage drop produced across the resistor 60 by the combined saturation currents of both conducting paths of valve 52. Assuming this voltage drop to be 50 volts, the slider 63a will be adjusted to the 250-volt point on the voltage divider 62, 63, and a net voltage of 50 volts will appear across the output terminals 49c and 49d when both valves 52 and 53 are at cutoff. This is the maximum positive output voltage of the cosine regulator and it exists when the force on the tracer finger is zero, as indicated by the point 51a on curve 51 in Fig. 5. As the force increases, the voltage supplied to the input terminals 49a and 49b increases linearly and in accordance with curve 47. This causes the left-hand conducting path of valve 52 to become conducing and to conduct an amount of current that increases as the input voltage increases. This increasing current produces an increasing voltage drop across resistor 60 which is in opposition to the voltage between terminals 54a and slider 63a so that the voltage of terminal 60a begins to decrease with the result that the net voltage across output terminals 49c and 49d decreases correspondingly. This is indicated in Fig. 5 by the negative slope of curve 51 between the points 51a and 51b. The magnitude of the current conducted by the left-hand conducting path of valve 52, and consequently, the steepness of the curve 51 between points 51a and 51b, depends upon the adjustment of anode resistor 56.

When the force on the tracer finger increases to the value b and the input voltage increases to a value corresponding to the height of curve 47 at point 47b in Fig. 5, the current in the left-hand conducting path of valve 52 reaches saturation, and the voltage across output terminals 49c and 49d is decreased to the value indicated by point 51b on curve 51. At this point, the right-hand path of valve 52 becomes conducting.

As the force on the tracer finger increases beyond the value b, the right-hand path of valve 52 conducts an increasing amount of current with the result that the voltage drop across the resistor 60 is further increased until the saturation point is reached, which occurs when the force on the tracer finger has a value corresponding to the dotted line c, Fig. 5. At this point, the voltage drop across resistor 60 is equal to the voltage drop between terminal 54a and the slider 63a with the result that the net voltage across the output terminals 49c and 49d is zero, which condition is represented in Fig. 5 by the curve 51 crossing the zero axis at point 51c. The slope of the curve 51 between points 51b and 51c is made greater than the slope between 51a and 51b by adjusting the resistor 57 to a lower value than resistor 56.

As the force on the tracer finger is increased beyond the value c, the left-hand and right-hand paths of valve 53 are successively rendered conducting, and the voltage drop across resistor 60 is correspondingly increased with the result that the terminal 60a becomes more negative than the slider 63a, thereby reversing the polarity of the voltage across the output terminals. With increasing force on the tracer finger the output voltage takes on the successive values indicated by the negative half of curve 51 until at a force corresponding to dotted line e, both conducting paths of valve 53 are saturated and the voltage drop across resistor 60 is twice the voltage drop between terminal 54a and slider 63a, so that the net voltage across the output terminals 49c and 49d is equal in magnitude and opposite in polarity to the maximum positive voltage. This maximum negative voltage is represented in Fig. 5 by the point 51e, the ordinate of which is equal to but opposite in sign to the ordinate of the point 51a which represents the maximum positive voltage. Thus it is seen that by proper adjustment of resistors 56, 57, 58, and 59, the voltage output of the cosine regulator is caused to approximate a true cosine function of the force applied to the tracer finger. A closer approximation, if desired, can be obtained by increasing the number of valves.

Figure 4:
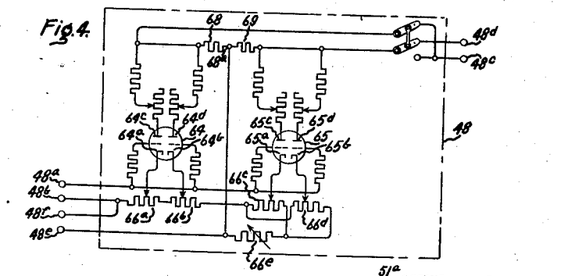

The sine regulator 48 is similar in most respects to the cosine regulator. It comprises two electric valves 64 and 65 which are identical with valves 52 and 53 of the cosine regulator. The grids of both valves are connected together to the input terminal 48a. A voltage divider comprising fixed resistors 66a, 66b, 66c, and 66d and adjustable resistor 66e is connected across the power input terminals 48e and 48f. The cathodes 64a, 64b, 65a, 65b are connected to points on the voltage divider of progressively increasingly positive voltage, so that the left-hand conducting path of valve 64 is biased to cutoff and the right-hand path and both paths of valve 65 are biased beyond cutoff by progressively increasing amounts. The anodes 64c and 64d of valve 64 are connected to output terminal 48c, and the anodes 65c and 65d are connected to output terminal 48d. Two resistors 68 and 69 are connected in series across the output terminals and their junction point 68a is connected to the positive power input terminal 48e.

When both valves are at cutoff the voltage difference across the output terminals is zero. However, as the force on the tracer finger is increased from zero, the voltage from amplifier 45 is applied to the input terminals 48a and 48b, and the left and right-hand paths of valve 64 become successively conducting and produce voltage drops across resistor 68 so that a net voltage appears across the output terminals 48c and 48d. The portion of the curve 50 between zero and 50b represents the output voltage as the force increases from zero to the value b, and the portion of the curve between the points 50b and 50c represents the output voltage as the force increases from b to c. As the force increases beyond the value c both paths of valve 65 become successively conducting and produce a voltage drop across resistor 69 which is in opposite sense to the voltage drop across resistor 68, and therefore, decreases the net voltage at the output terminals. The portion of curve 50 between points 50c and 50d represents the output voltage as the force increases from value c to value d, and the portion between the points 50d and 50e represents the output voltage as the force increases from value d to value e.

Thus the force on the tracer finger increases linearly from zero, the output voltage of the cosine regulator 49 varies continuously from a maximum positive value to a maximum negative value, and the magnitude of the output voltage of the sine regulator 48 is simultaneously varied continuously but inversely to the magnitude of the output voltage of the cosine regulator. However, the polarity of the output voltage of the sine regulator does not change.

The transverse movement of the cutter 15 is effected by means of an electric motor 70, the drive shaft of which is connected to the cross slide 17 of the lathe through suitable driving connections illustrated as comprising worm gearing 71, shaft 72, bevel gearing 73, and a lead screw 74.

Although the motor 70 may be of any suitable type, it is illustrated as a split series field direct current motor. Power is supplied to the motor 70 from a suitable source of single phase alternating voltage which is represented by the two supply lines 75 through a transformer 76 and suitable electric valve apparatus comprising the thyratron valves 77 and 78. These two valves 77 and 78 are connected as half-wave rectifiers and individually supply voltage to the motor through one or the other of the split field windings 70a or 70b to effect rotation of the motor in the forward or reverse direction as required. The anodes 77a and 78a of thyratrons 77 and 78 are connected through the field windings 70a and 70b in parallel and through the armature of motor 70 to the right-hand terminal of the secondary winding of transformer 76, and the cathodes 77b and 78b are connected to the left-hand terminals of the secondary winding. A pair of resistors 79 and 80 is connected in series relationship with each other across the control grids 77c and 78c, and the junction point 79a of these two resistors is connected through the active portion of a potentiometer resistor 81 between the terminal 79a and the slider 81a to the cathodes 77b and 78b. A periodically varying voltage is supplied from a source 82 through a phase shifting bridge network to the potentiometer 81 and thence to the control grids 77c and 78c. The source 82 may be and preferably is the same source as the source 75 to which the anodes are connected. As shown, the phase shifting bridge network comprises the opposite halves of the secondary winding of the transformer 83, the adjustable resistor 84, and the capacitor 85. By suitably adjusting the resistor 84, the alternating component of voltage supplied to the control grids may be dephased with respect to the anode voltage. Preferably the resistor 84 is adjusted so that the alternating voltage supplied to the control grids is dephased from the anode voltage by approximately 90 degrees lagging, with the result that the thyratrons 77 and 78 conduct only during a small portion of the positive half-cycle of the voltage applied to the anodes 77a and 78a.

For the purpose of amplifying the direct voltage output of the cosine regulator, a suitable amplifier comprising a twin triode valve 86 is provided. Power is supplied to the power input terminals 86a and 86b of this amplifier from a suitable independent D. C. source. The control grids of this amplifier are biased to provide push pull class A operation with both paths of the valve conducting equal amounts of current through resistors 87 and 88. When a voltage is supplied from the cosine regulator to the grids of valve 86, one path is caused to conduct more current than the other, depending upon the polarity of the voltage from the cosine regulator with the result that the voltage drop across one of the resistors 87 and 88 is increased and the voltage drop across the other is decreased. As a result, a direct current voltage component in the positive direction is applied to the grid of one of the thyratrons. This direct current component adds to the alternating current component supplied to the grid in such a direction as to have the effect of advancing the phase of the grid voltage thereby to render the thyratron conducting by an amount proportional to the magnitude of the voltage supplied from the cosine regulator to the amplifier valve 86. At the same time, a direct current component is supplied to the control grid of the other thyratron in such a direction that it further retards the phase of the grid voltage, and thus the thyratrons 77 and 78 are selectively energized to effect rotation of motor 70 in one direction or the other depending upon the polarity of the output voltage of the cosine regulator. In the circuit shown when the output terminal 49c of the cosine regulator is positive, the thyratron 77 is energized and that current is supplied to the motor 70 in such a direction for example as to cause the tool 15 to be moved inward toward the work piece 10.

Conversely, when the output terminal 49d of the cosine regulator is positive, the thyratron 78 will be energized and the motor 70 will be caused to rotate in a direction to withdraw the tool 15 from the work. The rotational response may be reversed by means of a switch in lines 49c, 49d as required.

The amplification ratio of amplifier 86 is such that a very small voltage, e. g., one volt across the output terminals of the cosine regulator will fully advance the phase of the grid voltage of one or the other of the thyratrons 77 and 78. As a result, the active thyratron tends to supply a current to the armature of the motor 70 which is several times full load value. This would tend of course to accelerate the motor 70 to maximum speed for any output voltage of the cosine regulator in excess of one volt.

For the purpose of accurately regulating the speed of motor 70 to a value corresponding to the instantaneous magnitude of the output voltage of the cosine regulator, means are provided for supplying to the grid circuit of the amplifier valve 86 a signal voltage which is proportional to the speed of the motor 70 and opposite in polarity to the voltage supplied from the cosine regulator. This signal voltage is provided by means of a tachometer generator 89 which is driven by motor 70 and generates a voltage which is linearly proportional to the speed of motor 70. This signal voltage is applied across a resistor 90 in the grid circuit of amplifier valve 86 so that it opposes the voltage supplied from the cosine regulator, and the difference of the two voltages is the effective control voltage on the grid of the amplifier valve. The tendency of this feedback circuit is to regulate the signal voltage to the output voltage of the cosine regulator. In other words, it maintains the signal voltage approximately equal to the output voltage of the cosine regulator. Since the signal voltage is linearly proportional to the speed of motor 70, an equilibrium condition is reached when the difference of the two voltages is just sufficient to cause the motor 70 to operate at a speed which accurately corresponds to the magnitude of the output voltage of the cosine regulator. Since the output voltage of the cosine regulator is a cosine function of the force applied to the tracer finger, the speed of the motor 70 will also be a cosine function of this force.

The longitudinal feed lead screw is driven by a motor 91 which is controlled to operate at a speed which is proportional to the magnitude of the output voltage of the sine regulator 48 by means of electric valve apparatus shown within the dotted rectangle 92. This apparatus is identical with the electric valve apparatus which controls the cross feed motor 70, and accordingly, a repetition of the description and operation of this electric valve apparatus is omitted. The tachometer generator 93 performs the same function in regulating the speed of the longitudinal feed motor 91 that is performed by tachometer generator 89 in regulating the speed of the cross feed drive motor 70.

A voltmeter 94 is connected across the output terminals of the amplifier 45. The scale of this meter is so calibrated that each graduation corresponds to .00005 inch deflection of the tracer finger. The meter can thus be used as a very accurate gauge for electrical adjustment of the cross feed of the compound rest for taking finished cuts. Since it is possible to estimate fairly accurately one-half the distance between scale graduations, the cross feed can be adjusted to within .000025 inch of a desired position. This degree of accuracy exceeds by a wide margin that obtainable by means of the usual mechanical scales on the cross feed adjustment of a lathe. The electrical adjustment consists in shifting the bridge balance the desired degree by means of the potentiometer 41. Also, the voltmeter 94 serves as an extremely accurate measuring device in setting up a templet on the templet supporting plates.

Any lack of parallelism between the longitudinal edge of the templet and the center axis of the lathe and the amount of such divergence is readily indicated on the meter by moving the tracer finger along the longitudinal edges of the template with no work piece in the lathe.

With the foregoing understanding of the elements and their organization in the system, the operation of the system will readily be understood from the following detailed description.

It may be assumed that the tool and tracer are in position for starting a cut. In other words, the tracer point 25b will be withdrawn from the longitudinal edge 13a at the left of the pattern, as indicated in Fig. 6 which is an enlarged schematic view of the portion of the pattern constituting the longitudinal edge 13a and the semicircular edge 13b. The tracer point 25b is in the position indicated in Fig. 6, and the tool 15 is in a corresponding position with respect to the work piece 10.

The system is energized by closing the switches 95, 96, and 97. Although the switches are illustrated as simple manually operated knife switches, it will be understood of course that they may be remotely controlled electromagnetic contactors. When the tracer point 25b is in the position illustrated in Fig. 6, no force is exerted on the tracer finger. Since, when no force is exerted on the tracer finger, the output voltage of the cosine regulator is maximum and the output of the sine regulator is zero, as indicated in Fig. 5, the cross feed motor 70 which is controlled by the cosine regulator will advance the tool toward the work piece and at the same time advance the tracer finger toward the templet at maximum speed, as indicated by the dotted arrow associated with the tracer point 25b in Fig. 6. The output voltage of the sine regulator being zero, the longitudinal feed motor 91 will be at rest and there will be no component of longitudinal movement of the tool. This relationship of the speeds of the cross feed motor 70 and the longitudinal feed motor 91 is indicated in Fig. 7.

Figures 7, 8:
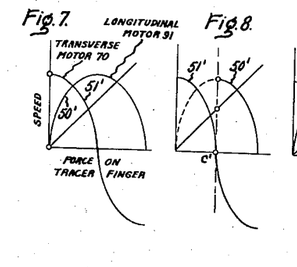
Figs. 7, 8, 9, 10, and 11 are charts of characteristic curves which illustrate the correlation of the speeds of the motors which produce the components of the relative movement of the cutter and work for the angles indicated in Fig. 6.

When the tracer point 25b engages the edge 13a of the pattern, a force is exerted on the tracer finger and this force quickly builds up to the value indicated by the dashed line $c'$ in Fig. 8, and the magnitude of this force is also indicated by the vector 96 in Fig. 6. As indicated in Fig. 8, when a force of this magnitude is applied to the tracer finger, the output of the cosine regulator decreases to zero and the output of the sine regulator increases to a maximum, with the result that the speed of the cross feed motor is decreased to zero and the speed of the longitudinal feed motor 91 is increased to maximum. This results in moving the tracer finger in a longitudinal direction with zero component of transverse motion as indicated by the dotted arrow 97a. Simultaneously of course the cutter 15 is moved along the work piece in the same direction.

As the tracer point 25b begins to move out of engagement with the edge 13a of the pattern at the corner 13b, the force on the tracer finger decreases at a rapid rate with the result that the speed of the cross feed motor 70 is rapidly increased to maximum and the speed of the longitudinal feed motor 91 is rapidly decreased to zero. This causes the tracer point to advance inwardly as illustrated by the dotted line 98 which indicates along the semicircular edge 13b of the pattern the path of movement of the center of the tracer point. The cutter is of course maintained in a corresponding position with respect to the work piece.

Figure 9:
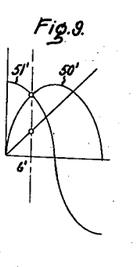

As the tracer finger 25b is moved inwardly along the semicircular curve 13b, the force on the tracer finger again increases linearly, thereby decreasing the speed of the cross feed motor 70 and increasing the speed of the longitudinal feed motor 91. When the tracer point has moved through 45 degrees of arc along the semicircular edge 13b, the force exerted on the tracer finger attains the magnitude indicated by the dashed line $b'$ in Fig. 9, with the result that the cross feed motor 70 and longitudinal feed motor 91 operate at equal speeds as indicated in Fig. 9 by the intersection of the sine curve and cosine curve on the dashed vertical line $b'$. Since the speeds of both motors are equal, the tracer point and the cutter 15 will have a direction relative to the pattern and work piece, respectively, which is at an angle of 45 degrees to the horizontal edge 13a as indicated by the arrow 97b in Fig. 6.

When the tracer finger reaches a position halfway along the semicircular curve 13b, the force on the tracer finger represented by the vector 96c against increases to the value represented by the dashed line $c'$ in Fig. 8 which is the same value of force that was exerted on the tracer finger when it first came into contact with the longitudinal edge 13a. As a result, at this point the tracer finger and the cutter are moved in a longitudinal direction with no component of transverse motion as indicated by the dotted arrow 97c in Fig. 6.

As the tracer finger 25b moves beyond the midposition on the semicircular curve in Fig. 6, the force on the tracer finger is increased beyond the value indicated by the vertical line $c'$ because the longitudinal feed motor 91 tends to keep forcing the tracer finger against the semicircular edge 13b and the speed of the cross feed motor is zero. But, as the force increases beyond the value indicated by the dashed line $c'$, the output voltage of the cosine regulator passes through zero and the polarity of the voltage reverses, with the result that the cross feed motor 70 rotates in the reverse direction to withdraw the tracer finger and the cutter.

This reverse component of the cross feed motion produced by the reverse rotation of the cross feed motor combined with the longitudinal component produced by the longitudinal feed motor causes the tracer and the cutter to follow a path along the semicircular edge 13b between the positions indicated by the vectors 96c and 96d in Fig. 6.

Figure 10:
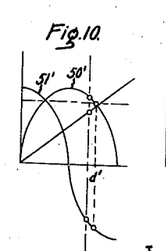

At the 45-degree position represented by the position of the vector 96d, the force on the tracer finger attains a value indicated by the magnitude of the vector 96d which corresponds to the magnitude of the force indicated by the dashed line $d'$ in Fig. 10, with the result that the cross feed motor 70 and the longitudinal feed motor 91 operate at speeds represented by the intersection of the dashed line $d'$ with the sine and cosine curves. In other words, the speeds of both motors will be equal and the cross feed motor 70 will be rotating in the reverse direction, i. e., the direction to withdraw the tracer finger and the tool. The results of these two components will produce a resultant relative movement of the tracer point and pattern indicated by the dotted arrow 97d and will of course also produce a corresponding relative movement between the cutter and the work piece.

Figure 11:
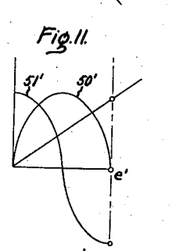

As the tracer point approaches the corner 13d, the component of movement produced by the cross feed motor can no longer relieve the force on the tracer finger, and consequently, this force continues to increase until when it attains a magnitude represented by the vector 96e and by the position of the dashed line e' in Fig. 11, the speed of the longitudinal feed motor 91 is decreased to zero and the speed of the cross feed motor 70 is increased to a maximum in the reverse direction as indicated by the intersection of the dashed line e' with the sine and cosine curves. As a result, the tracer point and the tool will be withdrawn at maximum speed.

However, as the tracer point tends to ride off the edge of the templet at the corner 13d, the force on the tracer finger decreases rapidly to the value indicated by the position of the dashed line c' in Fig. 8, with the result that the tracer finger and cutter are moved in a longitudinal direction with no component of transverse motion as indicated by the intersections of the dashed line c' with the sine and cosine curves 50' and 51' in Fig. 8. Thus, the relative movement of the cutter and work piece is controlled to follow a path corresponding to the contour of the pattern.

Thus, the relative movement of the cutter and work piece is controlled to follow a path corresponding to the contour of the pattern.

Figure 12:
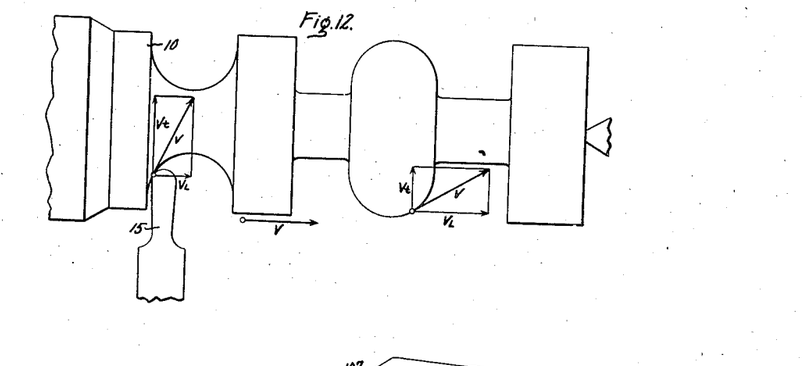
Fig. 12 is a diagrammatic sketch illustrating the constancy of the velocity of the relative movement between the cutter and work at all angles of such relative movement along the contour.

The constancy of the magnitude of the velocity V of the relative movement of the cutter and work piece for all cutting angles on the contour is illustrated in Fig. 12 and is explained mathematically as follows: The relationship between the sine and cosine functions of a variable quantity such as an angle is defined for all values of the angle by the equation:

(1) $$\sin^2 + \cos^2 = 1$$

or (2) $$\sqrt{\sin^2 + \cos^2} = 1, \text{ which is a constant}$$

Since the velocity of the longitudinal components $V_L$ is always proportional to the sine function of the force F on the tracer finger and the velocity of the transverse component $V_T$ is always proportional to the cosine function of the work F, therefore, (3) $$\sqrt{V_L^2 + V_C^2} = \text{a constant}$$

and since the resultant velocity $$V = \sqrt{V_L^2 + V_C^2}$$

therefore V equals a constant.

In other words, the velocity V of the relative movement of the cutter and work piece is constant for all angles of such movement along the path of the contour of the work piece.

Figure 13:
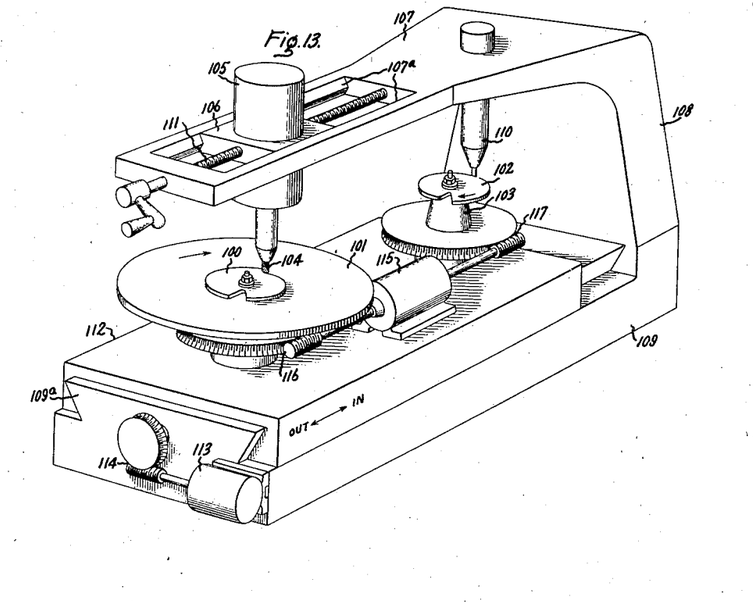
Fig. 13 is a view in perspective illustrating an application of the invention to a polar co-ordinate type milling machine.

In Fig. 13 which illustrates an application of the invention to a polar co-ordinate type milling machine, the work piece 100, which is illustrated as a cam, is mounted on a rotating table 101 and the pattern 102 is secured to a frustum shaped spindle 103.

The milling cutter 104 together with its driving motor 105 are mounted on a head 106 which, in turn, is slidably mounted in ways 107a built in the crossrail 107. In many types of milling machines, the crossrail is slidably mounted on uprights to provide for elevation, but in the simple milling machine illustrated, the crossrail is fixedly secured to an upright 108 which preferably is formed integral with the bedplate 109. The tracer finger 110 is fixedly mounted on the crossrail 107, and a manually rotatable lead screw 111 serves to position the head 106 along the ways to provide for initial adjustment of the distance between the milling cutter and the tracer finger.

The table 101 and spindle 103 are rotatably mounted on a platen 112 which is slidably mounted on the slide 109a with which the bedplate 109 is provided.

Figure 14:
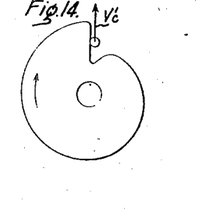
Figs. 14 and 15 are diagrammatic sketches illustrating the operation of the invention as applied to the milling machine of Fig. 13.
Figure 15:
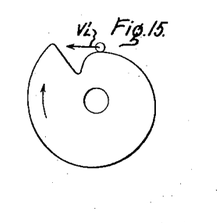

Movement of the platen 112 together with the rotating table 101 which supports the work piece and the spindle 103 which supports the pattern is effected by means of a lead screw (not shown) which is driven by means of an electric motor 113 through suitable worm gearing 114. This component of the relative movement of the cutter and work piece represented by the vector V'c in Fig. 14 corresponds to the transverse component of the relative movement produced by the cross feed motor 70 in the system of Fig. 1.

The table 101 and the pattern supporting spindle 103 are driven in synchronism with each other by means of an electric motor 115 to the drive shaft of which the table and the spindle are respectively connected through suitable worm gearing 116 and worm gearing 117 which have the same ratio. The component of relative movement between the cutter and the work piece produced by the motor 115 and represented by the vector V'L corresponds to the longitudinal component of movement produced by the longitudinal feed motor 91 in Fig. 1.

The cross feed motor 113 and the longitudinal or rotary feed motor 115 are controlled by means of electric valve apparatus (not shown) which is identical with the electric valve apparatus of Fig. 1. In other words, the motors 113 and 115 replace the motors 70 and 91, respectively, in the control system of Fig. 1.

The operation of the apparatus of Fig. 13 when translated into terms describing milling machine operation instead of lathe operation is in all material respects identical with the operation of the system of Fig. 1, and a repetition of such operation is omitted.

Frequently, it is desired to shape a workpiece from a pattern which requires a relative motion of the tool and workpiece in any direction in a plane through a range of 360 degrees or more. For example, it may be desired to utilize the milling machine of Fig. 13 to mill a workpiece from a pattern such as the pattern 119 of Fig. 16. This pattern has an undercut portion. Preferably, the relative motion between the tracer and the pattern and between the tool and the workpiece will follow the path indicated by the arrows along the edges 119a, 119b, 119c, 119d, 119e, 119f, and 119g in succession. The relative motion of the tracer along the edges 119b and 119f is opposite in direction to the relative motion along the edge 119d. Thus, to follow a pattern of this character on the milling machine of Fig. 13, the direction of rotation of the motor 115 must be reversed at predetermined points in the operation to reverse the direction of rotation of the table 101 and the pattern supporting spindle 103.

Figure 17:
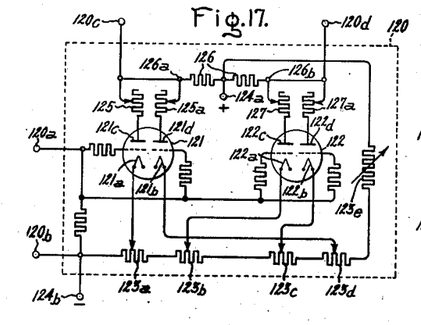
Figs. 17 and 19 are modifications of the electric valve regulators of Figs. 3 and 4, respectively, and are capable of producing relative motions between the tracer and the pattern and between the tool and the work piece in any direction in a plane.

To provide the necessary control of the motor 113, which moves the table 112 to produce the in-and-out or crossfeed motion, a modified form of the electric valve regulator of Fig. 3 is provided. This modified form of regulator is illustrated in Fig. 17 and is designated generally by the rectangle 120. It comprises two electric valves 121 and 122 which preferably are of the twin triode type. A voltage divider comprising fixed resistor portions 123a, 123b, 123c 123d, and a variable resistor portion 123e, is connected across the power input terminals 124a, 124b. The cathodes 121a, 122a, 122b, and 121b are connected by means of sliders in the order enumerated to points of progressively increasing positive voltage on the voltage divider, so that the left-hand path of valve 121 is biased to cutoff, and both paths of valve 122 and the right-hand path of valve 121 are biased beyond cutoff by progressively increasing amounts. The control grids of both valves are all connected together to the input terminal 120a, and the negative terminal of the cathode voltage divider is connected to the input terminal 120b. The input terminals 120a and 120b are connected to the output terminals of amplifier 45 of Fig. 1.

The anodes 121c and 121d are connected through parallel adjustable resistors 125 and 125a to the left-hand terminal of a center tapped resistor 126, and the anodes 122c and 122d are connected through parallel adjustable resistors 127 and 127a to the right-hand terminal of resistor 126. The center tap of the resistor is connected to the positive side 124a of the direct current power source 124a, 124b. Resistor terminals 126a and 126b are connected to the output terminals 120c and 120d, respectively, which in turn are connected to an electric valve type amplifier which supplies the crossfeed motor 113 of Fig. 13 and which is similar to the amplifier which supplies the crossfeed motor 70 of Fig. 1.

Figure 18:
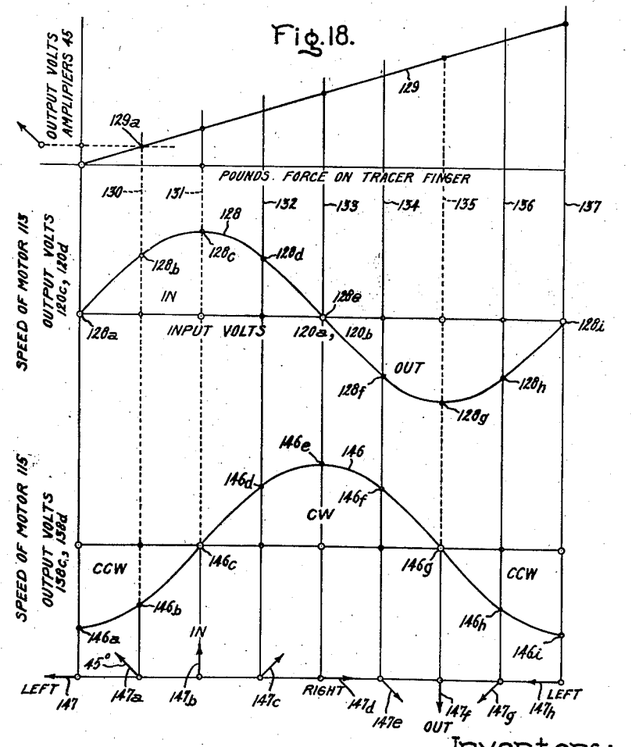
Fig. 18 is a chart of the characteristic curves which facilitate an understanding of the operation of the modified apparatus of Figs. 17 and 19.

The relationship between the voltage supplied to the input terminals 120a and 120b and the voltage across the output terminals 120c and 120d is illustrated in Fig. 18 by the sinusoidally shaped curve 128. The relationship between the force on the tracer finger and the voltage supplied by the amplifier 45 to the input terminals 120a, 120b is represented by the straight line 129.

The bridge circuit 40, 41, 42, 43 of Fig. 1 is balanced so that at zero force on the tracer, the output voltage supplied to the amplifier 45 is zero and all four conducting paths of valves 121 and 122 are cut off, and no current flows through the resistors 126. Consequently, the voltage across the output terminals 120c, 120d is zero. If the force on the tracer is increased, the voltage supplied to the input terminals 120a, 120b is linearly increased and the left-hand path of valve 121 becomes conducting, thereby to produce a voltage drop across the left-hand portion of resistor 126 which appears across the output terminals 120c, 120d. The magnitude of this voltage drop is represented by the ordinates of curve 128. Since the speed of the motor 113 is proportional to this voltage drop, the ordinates of the curve 128 also represent the speed of the motor 113.

In accordance with the output current characteristic of the valve 121, the anode current at first increases generally linearly until at a value of input voltage corresponding to a force on the tracer represented by the abscissa of the vertical line 130, the characteristic becomes nonlinear, as indicated by the portion of the curve 128 between the vertical lines 130 and 131. Thus, at a force on the tracer finger corresponding to vertical line 130, the voltage at the output terminals 120c, 120d and the speed of the crossfeed motor 113 which is proportional thereto, are represented by the ordinates of point 128b. As the force on the tracer finger increases between the values represented by vertical lines 130 and 131, the voltage drop across the output terminals 120c, 120d and the speed of the motor 113 increase in accordance with the portion of the curve between vertical lines 130 and 131. At a force on the tracer finger represented by the abscissa of vertical line 131, the left-hand conducting path of valve 121 reaches the saturation point, and the ordinate of the corresponding point 128c of the curve 128 represents the magnitude of the voltage across the output terminals 120c, 120d and the speed of motor 113.

A further increase in force on the tracer finger causes the left-hand path 122c of valve 122 to become conducting to produce a voltage drop across the right-hand portion of resistor 126 which opposes the voltage drop across the left-hand portion of the resistor. This reduces the differential voltage drop across the two halves of the resistor which is the net voltage across the output terminals, and correspondingly reduces the speed of motor 113.

At a force on the tracer finger corresponding in magnitude to vertical line 132, the output voltage and the speed of motor 113 decrease to values represented by the ordinate of point 128d. A further increase in the force to a value represented by vertical line 133 results in equal and opposite voltage drops across the opposite halves of resistor 126 with the result that the output voltage and the speed of the motor 113 decrease to zero, which condition is represented by the zero ordinate of point 128e.

A further increase in the force on the tracer finger causes the right-hand path of valve 122 to become conducting, thereby causing the voltage drop across the right-hand portion of resistor 126 to exceed the drop across the left-hand half with the result that the polarity of the differential of these two voltage drops is reversed. This reverse polarity differential voltage appears across the output terminals and causes the motor 113 to rotate in the reverse direction.

At forces corresponding in magnitude to the vertical lines 134 and 135, the reverse polarity output voltage and the speed of the motor 113 in the reverse direction of rotation attain values represented by the ordinates of points 128f and 128g.

When the force on the tracer attains the value represented by the vertical line 135, the right-hand path of valve 121 becomes conducting thereby increasing the voltage drop across the left-hand portion of resistor 126 and decreasing the differential of the voltage drops across both halves of the resistor, and the speed of motor 113 as represented by the portion of the curve 128 between the vertical lines 135 and 137. When the force on the tracer finger corresponds to the value represented by vertical line 137, the voltage drops across both halves of the resistor 126 are again equal and opposite. The result of this is that the differential or output voltage and the speed of the motor 113 become zero as represented by the ordinate of point 128i.

The characteristics of the valves 121 and 122 do not produce an exact sine relationship between the force on the tracer finger and the output voltage across the terminals 120c and 120d, and such exact sine relationship is not essential to the successful operation of the invention. However, by adjustment of the grid biases of the valves and adjustment of the anode resistors 125, 125a, 127, and 127a, the sine relationship can be very closely approximated.

Figure 19:
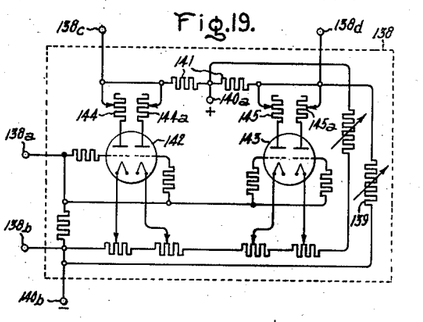

The motor 115 which rotates the work support 101 and the pattern spindle 103 is controlled by an electric valve regulator 138 having input terminals 138a and 138b and output terminals 138c and 138d. The input terminals 138a and 138b are connected to the output of the amplifier 45 of Fig. 1, and the output terminals 138c and 138d are connected to the twin triode amplifier which controls the supply of current to the motor 115. The regulator 138 differs from the regulator 120 primarily in that an adjustable resistor 139 is connected across the source 140a and 140b in series with the right-hand half of the center tapped potentiometer resistor 141. It differs further in that the grids of the valves 142 and 143 are progressively biased beyond cutoff so that in response to a progressively increasing input voltage, the left-hand and right-hand paths of valve 142 become conducting in succession, and the left-hand and right-hand paths of valve 143 subsequently become conducting successively in the order enumerated.

By adjusting the anode resistors 144, 144a, 145, and 145a and also by adjusting the biases of the valves 142 and 143, a relationship between the force on the tracer finger and the speed and direction of rotation of motor 115 is produced which simulates the negative cosine curve 146. A current normally flows through the right-hand half of resistor 141 and resistor 139, thereby producing a voltage drop across the right-hand half of resistor 141 which may be adjusted to a desired value by adjustment of resistor 139. This voltage drop appears across the output terminals 138c, 138d. Thus at zero force on the tracer, a voltage exists across the output terminals which causes the motor 115 to rotate the work table 101 and pattern spindle 103 in a counterclockwise direction. The magnitude of this voltage and the speed of motor 115 are represented by the ordinate of point 146a. Thus, for values of force on the tracer finger corresponding in magnitude to the abscissae of vertical lines 130 to 137, inclusive, the speed of the motor 115 attains corresponding successive values represented by the ordinates of points 146a to 146i, inclusive, respectively. At point 146c and at point 146g the motor 115 changes direction of rotation. For forces on the tracer finger between zero and the value represented by vertical line 131 and between the values represented by lines 135 and 137, the motor rotates the table 101 and the pattern spindle 103 in a counterclockwise direction, and for forces between the values represented by the lines 131 and 135 the rotation is in a clockwise direction.

The curves 128 and 146 illustrate the instantaneous relationship between the speeds of the motors 113 and 115. The instantaneous speeds of both motors for any force on the tracer is represented by the ordinates of the points of intersection of the curves 128 and 146 and a vertical line having an abscissa which is a measure of the force. Thus at zero force the speed of the motor 113 is zero as represented by the zero ordinate of point 128a, and the speed of motor 115 is a maximum in the direction which produces counterclockwise rotation of the work table 101, pattern spindle 103, as represented by the ordinate of point 146a. Consequently, the radial in-and-out or crossfeed component of the relative motion of the tracer and the pattern and the tool and work is zero, and the rotary or longitudinal component of this relative motion is a maximum in the direction which causes the portion of the periphery of the pattern 102 in contact with the tracer to move to the left. The relative motion between the pattern and tracer for zero force on the tracer is represented by the vector 147 directed to the left.

When the force on the tracer increases to a value corresponding to vertical line 130, the speeds of motors 113 and 115 are equal, as indicated by the ordinates of points 128b and 146b. The direction of rotation of motor 115 continues in the same direction, and the direction of rotation of motor 113 is in the "in" direction. The resultant relative motion of both components is therefore represented by the vector 147a directed at an angle of 45 degrees with the direction of vector 147.

For forces corresponding in magnitude to the vertical lines 131 to 137, inclusive, the magnitude and direction of the resultant relative motion are represented by the vectors 147b to 147h, inclusive, respectively. Thus, the resultant relative motion can be in any direction in a plane and, as indicated by the vectors 147 and 147a to 147h, inclusive, it is in a different direction but of the same magnitude for each value of the force.

Figure 16:
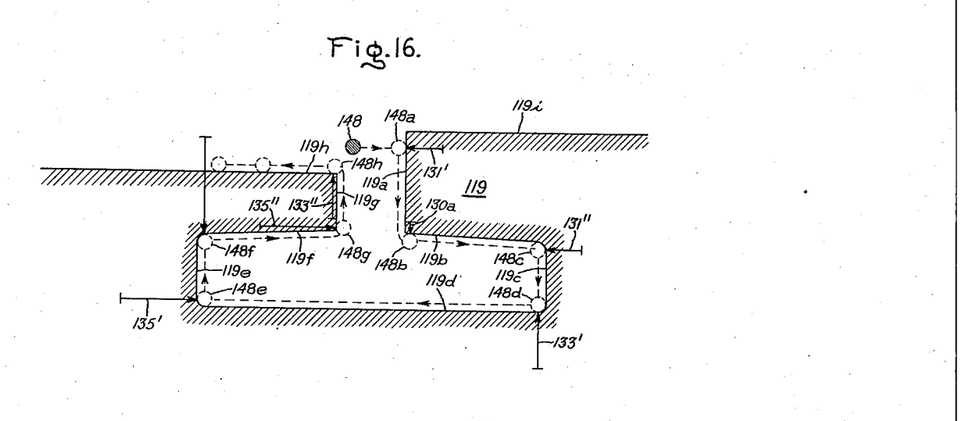
Fig. 16 is a diagrammatical sketch which illustrates graphically the variation of the force between the pattern and the tracer for various angles of a pattern which has an undercut area.

The operation of milling a workpiece to the contour of a pattern having an undercut portion such as illustrated in Fig. 16 is as follows: The position of the tracer relative to the pattern just prior to the beginning of the cut is indicated by the position of the small shaded circle 148. The milling cutter occupies a corresponding position relative to the workpiece.

Since the tracer is not in contact with the pattern, the force on the tracer is zero. The motor 113 is deenergized, and the motor 115 rotates at full speed in the direction which produces counterclockwise rotation of the pattern and workpiece, so that the motion is toward the left as represented by the vector 147. This motion continues at full speed until the edge 119a of the pattern engages the tracer as indicated by the position of the dotted circle 148a. As this motion tends to continue, the force on the tracer increases rapidly to the value represented by vector 131' in Fig. 16 which corresponds to the value represented by the abscissa of the vertical line 131 in Fig. 18. At this force, the motor 115 is stopped and the motor 113 operates at full speed to effect movement of the pattern and workpiece in an inward direction relative to the tracer and cutter as illustrated by vector 147b. This relative motion continues along the edge 119a of the pattern until at the position 148b, the force on the tracer finger tends to reduce to zero, which again results in a counterclockwise rotation or motion of the pattern and workpiece to the left. However, as indicated in Fig. 16, the edge 119b has a slight taper, and accordingly, the force builds up on the tracer to a value indicated by the vector 130a which corresponds to a force having a value between zero and a value corresponding to the vertical line 130, thereby producing a slight component of inward motion which combines with the longitudinal component to produce the relative motion along the edge 119b. The relative motion continues along the tapered edge 119b until at a position 148c the force on the tracer again builds up to a value represented by vector 131" which corresponds to the vertical line 131 of Fig. 18. This produces a relative inward motion along the edge 119c and a corresponding relative motion of cutter and workpiece.

At position 148d the edge 119d comes into contact with the tracer, and the force on the tracer build up to a value represented by vector 133' which corresponds to the value represented by vertical line 133 of Fig. 18. At this force, the motor 113 is stopped, and the motor 115 rotates at maximum speed in the reverse direction so that the motion of the pattern and the work is to the right as indicated by vector 147d of Fig. 18.

At position 148e the force on the tracer builds up to a value represented by vector 135' corresponding in value to the vertical line 135 with the result that the motion is "out" as indicated by vector 147f of Fig. 18.

This outward motion continues until the edge 119f strikes the tracer at position 148f and increases the force on the tracer finger to a value represented by the vector 136a, which is slightly less than the value represented by the vertical line 137 of Fig. 18. This produces a relatively large component to the left and a relatively small "out" component so that the resultant relative motion is along the slightly tapered edge 119f.

At the position 148g the force on the tracer tends to decrease to a value represented by vector 135" corresponding in value to the force represented by the vertical line 135. The relative motion is therefore "out" as illustrated by vector 147f of Fig. 18.

This outward motion continues along the edge 119g until at position 148h, the force on the tracer decreases to the value represented by the vector 133" which corresponds to the value represented by the vertical line 133 of Fig. 18. As illustrated by vector 147d of Fig. 18, this produces a motion of the pattern and workpiece to the right so that the relative motion is along the edge 119h, thereby completing the cut. Thus the relative motion of tracer and pattern, and tool and workpiece has progressed practically through the complete range of 360 degrees so that the workpiece is milled to conform to the shape of the pattern of Fig. 16.

Figure 20:
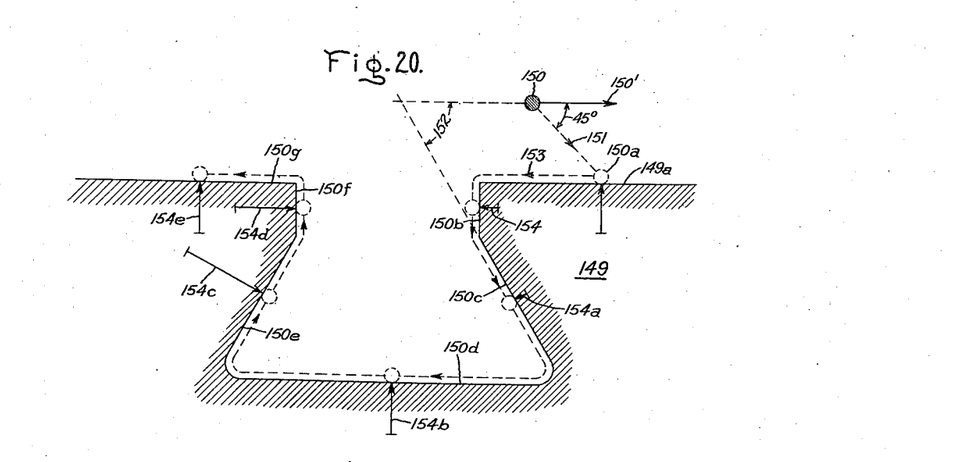
Fig. 20 is a diagrammatic sketch of a portion of a pattern having an undercut portion which is somewhat different from that of the pattern of Fig. 16 and serves to illustrate the versatility of the modified control apparatus of Figs. 17 and 19.

The pattern may be of a shape such as the pattern 149 in Fig. 20 in which it is necessary that the initial approach of the tracer to the pattern shall be from a position such, for example, as the position represented by the shaded circle 150. If no changes were made in the adjustment of the apparatus, the initial relative motion would be in the direction of the arrow 150' parallel to the edge 149a of the pattern, just as the initial motion in Fig. 16 was parallel to the edges 119h and 119i. Consequently, in the case of the pattern 149 the tracer and the pattern would never come into contact. However, by adjusting the position of the slider 41a on the resistor 41, the bridge circuit 40, 41, 42, 43 of Fig. 1 can be given an initial unbalance so that with no force on the tracer, a voltage will be supplied to the amplifier 45 which will cause the control system to respond exactly as it would respond if the unbalanced voltage were produced by a force on the tracer; for example, to produce an output voltage of the amplifier 45 corresponding in value to the ordinate of the point 129a on the linear curve 129 of Fig. 18. Consequently, the initial relative motion between the tracer and the edge 149a will take place at an angle of 45 degrees to the edge 149a as indicated by the vector 147a of Fig. 18 and the arrow 151 of Fig. 20. Forty-five degrees is not a critical value. The angle may be any value which is less than the value of the minimum undercut angle 152.

The initial relative movement proceeds in the direction of the arrow 151 until at the position 150a, the force on the tracer builds up to a value to produce relative motion along the edge 119a in the direction of the arrow 153. Thereafter, the force on the tracer will vary as indicated by the magnitude of the vectors 154, 154a, 154b, 154c, 154d, and 154e to produce relative motion along the profile edge of the pattern in the direction indicated by the arrows in a manner which is similar to that of the milling operation described in connection with the pattern of Fig. 16.

Although in accordance with the provisions of the patent statutes this invention is described as embodied in concrete form and the principle thereof has been described, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States is:

1. A contouring control system for a pattern controlled machine tool having a cutter comprising in combination, a tracer control element, means for supporting a pattern and a work piece in operative relationship respectively with said tracer and cutter, driving means for effecting relative movement of said cutter and work piece, means responsive to the force between said pattern and tracer for producing a variable direct voltage, means for deriving from said voltage a pair of control voltages that vary as the sine and cosine functions of said force and means responsive to said control voltages for controlling said driving means to effect said relative movement of said cutter and work piece with a velocity having angularly displaced components that vary approximately as sine and cosine functions of said force.

2. A contouring control system for a pattern controlled machine tool having a cutter comprising in combination, a tracer control element, means for supporting a pattern and a work piece in operative relationship respectively with said tracer and cutter, driving means for effecting relative movement of said cutter and work piece, means responsive to the force between said pattern and tracer for producing a variable direct voltage, electric valve means for deriving from said voltage two control voltages that vary as sine and cosine functions of said force, and means responsive to said control voltages for controlling said driving means to effect said relative movement with a velocity having two angularly displaced inversely varying components.

3. A contouring control system for a pattern controlled machine tool having a cutter comprising in combination, a tracer control element having a magnetostrictive member, means for supporting a pattern and a work piece in operative relationship with said tracer element and said cutter respectively, driving means for effecting relative movement of said cutter and said work piece, means responsive to engagement of said tracer element with said pattern for applying a force to said magnetostrictive member, and means responsive to the resulting change in permeability of said magnetostrictive member for controlling said driving means to effect said relative movement with a velocity having two angularly displaced inversely varying components.

4. A contouring control system for a pattern controlled machine tool having a cutter comprising in combination, a tracer control element having a magnetostrictive member, means for supporting a pattern and a work piece in operative relationship with said tracer element and said cutter respectively, a pair of electric motors for effecting relative movement of said cutter and said work piece, means responsive to engagement of said tracer element with said pattern for applying a force to said magnetostrictive member, and means responsive to the resulting change in permeability of said magnetostrictive element to control said motors to effect said relative movement with a velocity having a component that varies continuously from a maximum value in one direction to a maximum value in the reverse direction and an angularly displaced component that varies inversely in magnitude with said first component.

5. A contouring control system for a pattern controlled machine tool having a cutter comprising in combination, a tracer control element having a magnetostrictive member, means for supporting a pattern and a work piece in operative relationship with said tracer element and said cutter respectively, an electric motor for effecting relative movement of said tool and work piece in a first direction, a second electric motor for effecting relative movement of said tool and work piece in a direction angularly displaced from said first direction, means responsive to engagement of said tracer element with said pattern for applying a compressional force to said magnetostrictive member, and means responsive to the resulting change in permeability of said magnetostrictive member for effecting simultaneous operation of said motors at inversely varying speeds to effect a resultant relative movement of said tool and work piece with a velocity that is substantially constant for all angles.

6. A contouring control system for a pattern controlled machine tool having a cutter comprising in combination, a tracer control element having a magnetostrictive member, means for supporting a pattern and a work piece in operative relationship with said tracer element and said cutter respectively, a pair of electric motors for effecting relative movement of said cutter and work piece, means responsive to engagement of said tracer element with said pattern for applying a force to said magnetostrictive member, means responsive to the resulting change in permeability of said member for producing a variable direct voltage, means for deriving from said voltage two continuously inversely varying control voltages, and means individually responsive to said control voltages for controlling said motors to effect said relative movement at a substantially constant velocity having angularly displaced inversely and continuously varying components.

7. A contouring control system for a pattern controlled machine tool having a cutter comprising in combination, a tracer control element having a magnetostrictive member, means for supporting a pattern and a work piece in operative relationship with said tracer element and said cutter respectively, a pair of electric motors for effecting relative movement of said cutter and work piece, means responsive to engagement of said tracer element with said pattern for applying a force to said magnetostrictive member, means responsive to the resulting change in permeability of said member for producing a variable direct voltage, electric valve means for deriving from said voltage a pair of control voltages that vary as sine and cosine functions of said force, and means responsive to said control voltages for effecting simultaneous operation of said motors at speeds that vary respectively approximately as sine and cosine functions of said force to effect said relative movement of said cutter and work piece at a velocity that is substantially constant for all angles.

8. A contouring control system for a pattern controlled machine tool having a cutter comprising in combination, a tracer control element having a magnetostrictive member, means for supporting a pattern and a work piece in operative relationship with said tracer element and said cutter respectively, a pair of electric motors for effecting relative movement of said cutter and work piece, means responsive to engagement of said tracer element with said pattern for applying a force to said magnetostrictive member, means responsive to the resulting change in permeability of said member for producing a variable direct voltage, means for deriving from said voltage two continuously inversely varying control voltages, means for controlling said motors to effect said relative movement at a substantially constant velocity having angularly displaced inversely varying components comprising electric valve means provided with control grids.

9. A control system for causing a tracer element to follow the outline of a pattern comprising in combination, a tracer element, means mounting the pattern and tracer for relative movement, a reversible driving means for selectively effecting a component of relative movement of said pattern and tracer element in opposite directions, a second reversible driving means for selectively effecting a component of relative movement of said pattern and tracer element in opposite directions at an angle with said first component, and means responsive to the magnitude of the force exerted on said tracer element as a result of contact with said pattern for producing a variable direct voltage, means for deriving from said voltage two controlling voltages that vary approximately as sine and cosine functions of said force and a pair of electric valve means separately responsive to said sine and cosine control voltages for controlling the energization of both said driving means to effect a resultant relative movement of said pattern and tracer in any direction in a plane; said direction of said relative movement depending on the magnitude of said force.

10. A control system for causing a tracer element to follow the contour of a pattern comprising in combination, a tracer element, means mounting the pattern and tracer for relative movement in all directions in a plane, a first reversible driving means for effecting relative movement of said pattern and tracer element in a first path, a second reversible driving means for effecting relative movement of said pattern and tracer in a path at an angle with said first path, means responsive to a force of a first value acting on said tracer element for energizing said first driving means to effect said relative movement in said first path in one direction and responsive to a force of a second and substantially greater value for energizing said first driving means to effect said relative movement in said first path in the reverse direction, and means responsive to a force on said tracer element having a value intermediate said first and second values for controlling the energization of said second driving means to effect said relative movement in said second path in one direction and responsive to a force having a value substantially greater than said second value for effecting said relative movement in said second path in the reverse direction.

11. A control system for causing a tracer element to follow the contour of a pattern comprising in combination, a tracer element, means mounting said pattern and tracer element for relative movement in all directions in a plane, a first electric motor for effecting a first component of said relative movement, a second electric motor for effecting a second component of said relative movement at an angle with said first component, means responsive to successively increasing values of a force exerted on said tracer element for effecting rotation of said first motor at a speed that varies approximately as a sine function of said force and in opposite directions for values of said function of opposite sign, and means responsive to said increasing values of said force for simultaneously effecting rotation of said second motor at a speed that varies approximately as a cosine function of said force and in opposite directions for values of said cosine function of opposite sign.

12. In combination, a pattern, a tracer element, means mounting said pattern and tracer element for relative movement, a first electric motor for effecting a first component of said relative movement, a second electric motor for effecting a component of said relative movement at an angle with said first component, means responsive to successively increasing values of a force exerted on said tracer element for effecting rotation of said first motor at a speed having a relationship to said force generally similar to a sine function of said force and in opposite directions for values of said relationship of opposite sign, and means responsive to said increasing values of said force for effecting rotation of said second electric motor at a speed having a relationship to said force that is generally similar to a cosine function of said force and in opposite directions for values of said relationship of opposite sign.

13. A control system for causing a tracer element to folow the contour of a pattern comprising in combination, a tracer element, means mounting said pattern and tracer element for relative movement, a first electric motor for effecting a component of said relative movement, a second electric motor for effecting a component of said relative movement at an angle with said first component, electric valve apparatus responsive to successively increasing values of force exerted on said tracer element for effecting rotation of said first motor at a speed varying with said force generally as a sine function of said force and in opposite directions for values of said function of opposite sign, and additional electric valve apparatus responsive to said increasing values of said force for effecting rotation of said second motor at a speed varying with said force generally similarly to a cosine function thereof, and in opposite directions for values of said cosine function of opposite sign.

14. In combination, a pattern, a tracer element, means mounting said element and pattern for relative movement, a first reversible driving means for selectively effecting a component of said relative movement in opposite directions in a path, a second reversible driving means for selectively effecting a component of said relative movement in opposite directions in a path at an angle with said first path, electric valve means responsive to successively increasing values of force exerted on said tracer for energizing said first driving means for operation in one direction at speeds that attain successively increasing and decreasing values and then in the opposite direction at speeds that attain successively increasing and decreasing values, and additional electric valve means responsive to successively increasing values of said force for energizing said second driving means for operation successively in opposite directions at speeds which vary inversely as the speeds of said first driving means.

15. In combination, a pattern, a tracer element, means mounting said element and pattern for relative movement, a first electric motor for effecting a component of said motion in a first path, a second electric motor for effecting a component of said relative movement in a path at an angle with said first path, electric valve means responsive to a force exerted on said tracer element of successively increasing values for supplying to said first motor a voltage that attains successively increasing and decreasing positive values and successively increasing and decreasing negative values to control the speed and direction of said first motor, and a second electric valve means responsive to said increasing values of said force for simultaneously supplying a voltage to said second electric motor that successively attains negative and positive values varying inversely with the voltage supplied to said first motor to effect operation of said second motor in opposite directions and at speeds that vary in inverse relation to the speeds of said first motor.

16. A control system for a pattern controlled machine having a tool for cutting a work piece comprising, in combination, a tracer element, means mounting said tracer element and tool and said pattern and work piece for relative movement, a first electric motor for effecting a component of said relative movement in a path, a second electric motor for effecting a component of said relative movement in a path at an angle with said first path, electric valve means responsive to a continuously increasing force exerted on said tracer element in response to contact with said pattern for supplying to said first motor a voltage that attains successively increasing and decreasing positive values and successively increasing and decreasing negative values to control the speed and direction of rotation of said motor and additional electric valve means responsive to said continuously increasing force for simultaneously supplying to said second motor a voltage that successively attains negative and positive values varying inversely with the voltage supplied to said first motor to effect operation thereof selectively in opposite directions and at speeds that vary in inverse relation to the speeds of said first motor thereby to produce a substantially constant resultant relative speed of said tool and work piece along the contour of said work.

HANS P. KUEHNI.
NORMAN G. BRANSON.

CERTIFICATE OF CORRECTION.

Patent No. 2,388,555.   November 6, 1945.

HANS P. KUEHNI, ET AL.

It is hereby certified that error appears in the printed specification of the above numbered patent requiring correction as follows: Page 1, first column, line 32, for "carying" read --carrying--; page 3, second column, line 70, for "conducing" read --conducting--; page 6, first column, line 73, strike out the words "along the semicircular edge 13b of the pattern" and insert the same after the word "inwardly", line 71, same page and column; and second column, line 25, for "against" read --again--; page 12, first column, line 44, claim 13, for "folow" read --follow--; and that the said Letters Patent should be read with this correction therein that the same may conform to the record of the case in the Patent Office.

Signed and sealed this 26th day of February, A. D. 1946.

Leslie Frazer (Seal)   First Assistant Commissioner of Patents.